(12) United States Patent
Bilaney et al.

(10) Patent No.: US 8,776,255 B2
(45) Date of Patent: Jul. 8, 2014

(54) CLAIMS-AWARE ROLE-BASED ACCESS CONTROL

(75) Inventors: Rakesh P. Bilaney, Andhra Pradesh (IN); Samuel R. Devasahayam, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 12/895,672

(22) Filed: Sep. 30, 2010

(65) Prior Publication Data

US 2012/0084869 A1 Apr. 5, 2012

(51) Int. Cl.
| | | |
|---|---|---|
| G06F 21/00 | (2013.01) | |
| G06F 21/33 | (2013.01) | |
| G06F 21/62 | (2013.01) | |
| G06F 21/10 | (2013.01) | |
| H04L 29/06 | (2006.01) | |
| G11B 20/00 | (2006.01) | |

(52) U.S. Cl.
CPC .............. *G06F 21/335* (2013.01); *G06F 21/33* (2013.01); *G06F 21/6218* (2013.01); *G06F 2221/2141* (2013.01); *G06F 21/10* (2013.01); *G11B 20/00086* (2013.01); *H04L 2463/101* (2013.01); *H04L 63/0428* (2013.01)
USPC .............. 726/27; 726/1; 726/2; 726/3; 726/26

(58) Field of Classification Search
CPC ... G06F 21/335; G06F 21/10; G06F 21/6218; G06F 21/33; G06F 2221/2141; G11B 20/00086; H04L 2463/101; H04L 63/0428; H04L 41/5061
USPC .................. 726/27, 1, 2, 26, 28–33
See application file for complete search history.

(56) References Cited

U.S. PATENT DOCUMENTS

| 7,434,252 | B2 * | 10/2008 | Ballinger et al. ............... 726/10 |
| 7,603,555 | B2 | 10/2009 | Schmidt et al. |
| 7,640,573 | B2 | 12/2009 | Della-Libera et al. |
| 7,653,934 | B1 * | 1/2010 | Joshi ............................... 726/6 |
| 2009/0276834 | A1 | 11/2009 | Bloesch |
| 2009/0320103 | A1 | 12/2009 | Veeraraghavan et al. |
| 2010/0001833 | A1 | 1/2010 | Alexander et al. |
| 2010/0100941 | A1 * | 4/2010 | Eom et al. ......................... 726/4 |
| 2010/0299738 | A1 * | 11/2010 | Wahl ............................... 726/9 |
| 2011/0088090 | A1 * | 4/2011 | O'Brien et al. ................. 726/19 |

OTHER PUBLICATIONS

Brown et al, A guide to cliams-based identity and access control, 2010.*
Wu et al, The implementation of role-based access control on the web, 2001.*

(Continued)

*Primary Examiner* — Andy Rao
*Assistant Examiner* — Shan Elahi
(74) *Attorney, Agent, or Firm* — Tony Azure; Raghu Chinagudabha; Micky Minhas

(57) ABSTRACT

The formulation of a security token that specifies role information corresponding to one or more roles of a requesting entity that is to request an action to be performed on a resource. The formulation begins by accessing one or more claims, each having an expression regarding the requesting entity. The expression for at least one of the claims is evaluated to thereby assign the requesting entity to one or more identities. The identities are then used determine role information to include in a role-based security token that may be submitted to the computing system that manages the resources.

18 Claims, 3 Drawing Sheets

(56) References Cited

OTHER PUBLICATIONS

Keith Brown, Exploring Claims-Based Identity, Pub. Date: 2010 (9 pages).
Managing Claims and Authorization with the Identity Model, Pub. Date: 2010 (6 pages).
Ethan Wilansky et al., Identity and Access Strategies for SharePoint Products and Technologies (Part 2): Membership and Role Provider Assignment, Pub. Date: 2010 (24 pages).
Identity and Access Control, Pub. Date: 2010, (2 pages).

* cited by examiner

CLAIMS-AWARE ROLE-BASED ACCESS CONTROL

BACKGROUND

In computer programming, a "claim" includes a declaration made by an entity (often referred to as an issuer). The claim is often packaged in a security token in such a way that the declaration can be truly attributed as being made by the issuer with high confidence. The security tokens have protections against being tampered with. Accordingly, a relying party that receives the security token can access the claim, evaluate the issuer, and ascribe an appropriate amount of trust to the declaration made by the issuer. Often, the issuer is highly trusted, and thus the declaration is taken by the relying party to be true. The relying party may then perform appropriate processing taking as a given that the declaration is true.

Authentication is conventionally externalized using claims and security tokens. When a client tries to access the services of a relying party, if externalized authentication is performed, the client is referred to a security token service. In the case of a browser client, this is usually through an HyperText Transport Protocol (HTTP) redirect. The security token service authenticates the user, and formulates appropriate claims regarding the user. The security token service has pre-negotiated with the relying party regarding what declarations will be most useful. The claims are then packaged in a security token and returned to the client, whereupon the client is referred back to the relying party. The client then provides the security token to the relying party, whereupon the relying party evaluates the security token, accesses the claims, and perhaps takes the declarations therein to be true, and performs appropriate processing given the declarations made.

There may be multiple tiers of security token services. For instance, the first-tier security token service mentioned above may refer the client to yet a second-tier security token service and expect a second-tier security token in return from the second-tier security token service. In that case, the first-tier security token service with be a relying party for the second-tier security token, and formulate the claims based on the claims made therein. The first-tier security token service would then formulate the first-tier security token and return that to the relying party that the user originally requested the service from.

BRIEF SUMMARY

At least one embodiment described herein relates to the formulation of a security token that either directly specifies a role or includes at least partial information (called hereinafter "intermediate role information") from which a role may be later derived. The role is of a requesting entity that is to request an action to be performed on a resource, wherein authorization of access to the resource is restricted by role of the requesting entity. The term "role information" will be used to refer to either or both of the direct specification of the role, or the intermediate role information from which the role may be derived through further processing.

The formulation of the security token begins by accessing one or more claims, each having an expression regarding the requesting entity. The expression for at least one of the claims is evaluated to thereby assign the user to one or more identities. The identities are then used to identify the role information that is to be included in the security token that may be submitted to the computing system that manages the resources. This security token may be referred to herein as a "role-based" security token in that it includes role information in the form of either a direct expression of the role, or in the form of intermediate role information.

In one embodiment, the role information is obtained by identifying an access policy corresponding to at least one of the one or more identities. The access policy specifies the action and a permission status corresponding to one or more resources including the desired resource. For at least the desired resource, a role is identified that, if held by the requesting entity, would cause a provider of the corresponding resource to enforce the permission status for the action should the requesting entity request to perform the action on the corresponding resource. The security token is then constructed that includes role information that either directly specifies the role or specifies intermediate role information from which the role may be later derived. The requesting entity may then submit the security token to the provider of the desired resource, which will be interpreted by the provider as a relying party, and will thereby enforce the permission status associated with the role or roles specified in the security token. If the role information in the security token is intermediate role information, then the relying part may further process the intermediate role information to thereby derive the role. Either way, the identification of the role will allow enforcement of the permission status associated with the role or roles identified from the role information.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the formulation of a role-based security token is described. The role-based security token specifies role information from which one or more roles of a user may be obtained. The role(s) may then be used to determine authorized actions that may be performed on one or more resources at a relying party. The formulation begins by accessing one or more claims, each having an expression regarding the user. The expression for at least one of the claims is evaluated to thereby assign the user to one or more identities. The identities are then used to identify role information corresponding to one or more roles that, if held by the requesting entity, would cause a provider of the corresponding resource to perform the action on the corresponding resource. The role information is then included in a role-based security token that may be submitted to the computing system that manages the resources. First, some introductory discussion regarding computing systems will be described with respect to FIG. 1. Then, the embodiments of the security token formulation will be described with respect to FIGS. 2 and 3.

Figure 1:
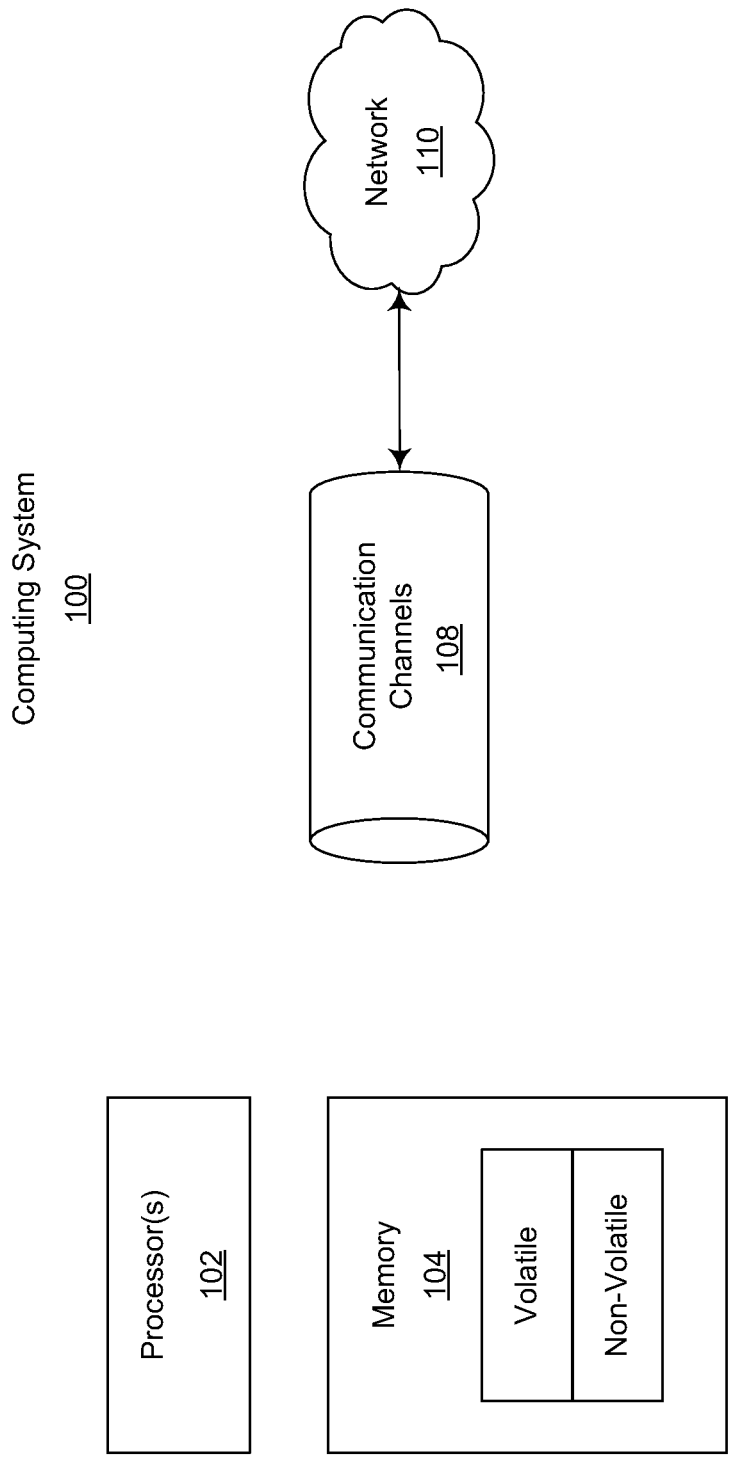
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
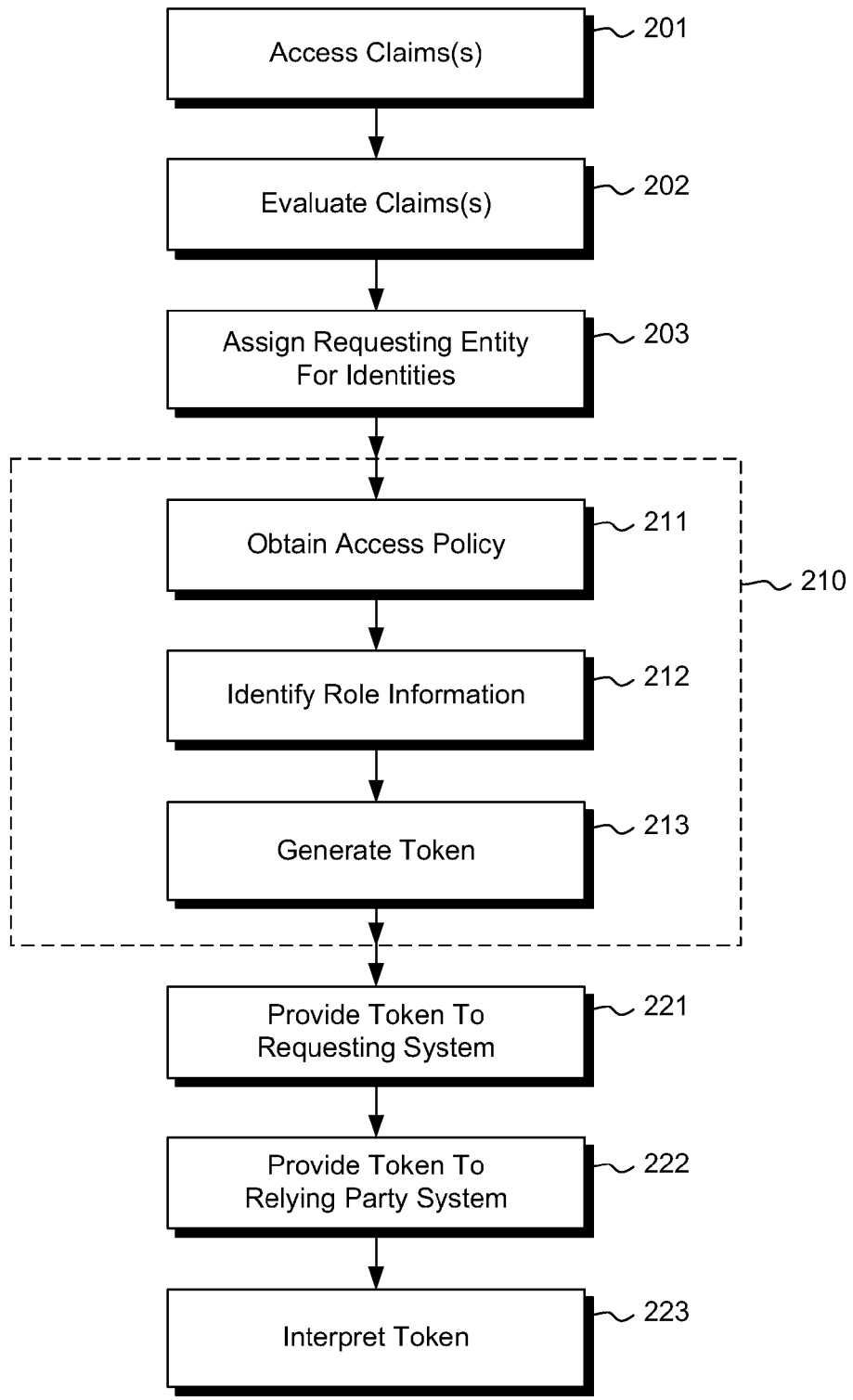
FIG. 2 illustrates a flowchart of a method for generating a role-based security token.
Figure 3:
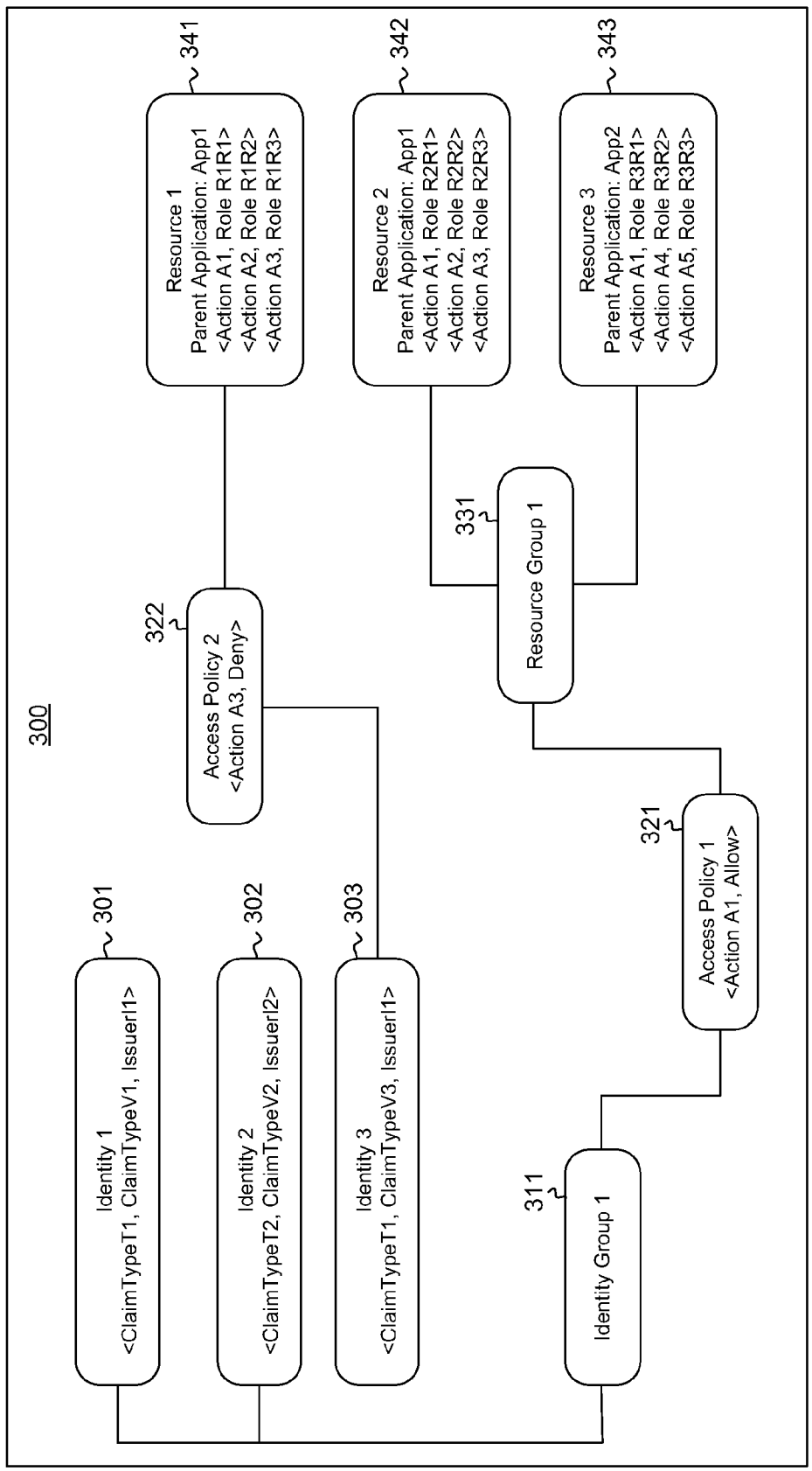
FIG. 3 illustrates a concrete example of several related data structures that may be used to formulate a security token that is claims based and relies on role-based access.

FIG. 2 illustrates a flowchart of a method 200 for formulating a role-based security token. The security token is generated using a claims based architecture in conjunction with role based access. This makes it easier to externalize both authentication and authorization from the application. FIG. 3 represents an example of related data structures 300 that may be used in the formulation of a security token. While the method 200 is flexible in that it may be performed on a wide variety of structures, method 200 will be described as applying to the data structures 300 of FIG. 3 as one specific concrete example. Accordingly, the description of FIGS. 2 and 3 will be intermingled.

The method 200 may be performed whenever any given entity is going to be requesting access to an application that externalizes authentication and authorization using role based access and a claims based architecture. However, the method 200 will now be described with respect to a particular user running an application that is requesting a service.

At this point, a few terms will now be explained. In this description and in the claims, a "relying party" system is a computing system on which the application that is providing the target service is running. The "requesting party" system is a computing system which runs the application (also called herein the "requesting application") that requests some kind of access to the target service running on the relying party system. The requesting entity is either the requesting application or its user. The relying party externalizes authentication and authorization of the requesting entity. The "externalization" system is a computing system that the target service uses to externalize authentication and authorization of the requesting entity. A "claim generation" system is a computing system that provides claims regarding the requesting entity to support the externalization process.

Each of these computing systems may be structured as described above for the computing system 100 of FIG. 1. Each of the computing systems may be a single computing system, or may be several distributed computing systems that are cooperatively interacting. Alternatively or in addition, any two or more of the computing systems may be combined into a single computing system.

The method 200 includes the accessing of one or more claims (act 201), each having one or more claims regarding the requesting entity. The act 201 may be performed by the externalization system. The claims themselves are generated by a claims generation system such as a security token service. Alternatively or in addition, the externalization system may generate claims regarding the requesting entity in which case there is no need to package the claim in a security token as the claims may be directly consumed by the externalization system.

The claims are then evaluated (act 202). Again, this act may be performed by the externalization system. If the claim(s) regarding the requesting entity are embedded within a security token, the externalization system may unwrap the security token to access the claim. The claim expression may be accessed from the claim once unwrapped from the security token.

The requesting entity is then assigned to one or more identities (act 203) using the evaluation of the expression of the claim. Referring to FIG. 3, there are three identity objects 301, 302 and 303, each defining a claim that, if encountered regarding the requesting entity, would cause the requesting entity to be classified under the identity. For instance, if the claim as a claim type T1, has a claim value V1, and is issued by an issuer I1, then the requesting entity would be assigned to Identity 1. Likewise, if the claim as a claim type T2, has a claim value V2, and is issued by an issuer I2, then the requesting entity would be assigned to Identity 2. Finally, if the claim as a claim type T1, has a claim value V3, and is issued by an issuer I1, then the requesting entity would be assigned to Identity 3.

As a more concrete example called herein the "patent application" example, suppose that T1 is a CompanyEmployment claim type, that value V1 is "ABC Fiction Inc.", and that Issuer I1 is also ABC Fiction Inc. In that case, any requesting entity that ABC Fiction Inc. claims is an employee of ABC Fiction Inc. would be assigned to the Identity 1. Now suppose T2 is a FormerEmployeeOfABCFiction claim type, value V2 is "Yes", and Issuer I2 is "Parent Company Human Resources". In that case, any requesting entity that the human resources department of ABC Fiction Inc.'s parent company claims was a former employee of ABC Fiction Inc., will be assigned to Identity 2. Finally, suppose value V3 is "Competitor Company". In that case, any requesting entity that the ABC Fiction Inc. claims is an employee of a competitor company will be assigned to the Identity 3. This patent application example will be returned to frequently as a concrete example of the more general principles described herein.

One or more of the corresponding identities may be an identity group representing a collection of identities. Referring to FIG. 3, for example, identity group 311 represents the aggregate of Identity 1 and Identity 2. Thus, in the patent application example, the requirements for a requesting entity to have membership in the Identity Group 1 are that the requesting entity is either claimed by ABC Fiction Inc. to be an employee of ABC Fiction Inc., or that the requesting entity is claimed by ABC Fiction Inc.'s parent company to have been a former employee of ABC Fiction Inc. By using a combination of identity groups and identities, a hierarchical structure of identities may be constructed.

Referring back to FIG. 2, the one or more identities of the requesting entity may then be used to acquire a role-based security token applicable to the requesting entity (act 210). Specific acts associate with this acquisition will now be described, and may be performed by the same computing system that performed acts 201 through 203, or perhaps by a different computing system within the externalization system. If the computing system that generates the role-based security token is different, then a request is submitted for the role-based security token, the request including the one or more identities associated with the requesting entity.

The externalization system then identifies an access policy corresponding to at least one of the one or more identities (act 211). The access policy specifies an action and a permission status corresponding to one or more resources. Referring to FIG. 2, the Identity Group 1 is associated with Access Policy 1 (represented by element 321). Access Policy 1 represents an action A1, and a permission status (Allow) which associates the Identity Group 1 to the Resource Group 1 (represented by element 331). Here, the Resource Group 1 represents a collection of resources including Resource 2 (represented by element 342), and resource 3 (represented by element 343). The resources may thus by hierarchically structured by having a resource (i.e., a resource group) represent a collection of one or more child resources, which themselves could be resource groups or resources.

The identity 3 is associated with Access Policy 2. This shows that an identity need not be associated with an access policy through an identity group. Access policy represents an action A3 and a permission status (Deny) are to be associated with Resource 1 (represented by element 341) when a requesting entity is requesting access to Resource 1.

Extending the patent application example, suppose that Resources 1, 2, and 3 are each patent applications that are owned by ABC Fiction Inc. Now suppose Action A1 is a view action that would permit the requesting entity to view the patent application status and image file wrapper. Suppose further that Action A3 is a status view action that would permit the requesting entity to view the status of the patent application, but not the entire file wrapper.

The externalization system then identifies role information corresponding to one or more roles that, if held by the requesting entity, would cause a provider of the corresponding resource to enforce the permission status for the action should the requesting entity request to perform the action on the corresponding resource (act 212). The role information might be an expressed direct identification of the role, or it may be intermediate role information from which the role may be later derived by the relying party. Examples of intermediate role information might include a list of identities assigned to the requesting entity, a list of access policies applicable to the requesting entity for the resources belonging to the relying party, and so forth for any other type of information from which the role may be derived. Thus, hereinafter, role information "corresponding to" a role means role information that expressly identifies the role, or which includes sufficient information that may be used by the relying party to identify the role.

Referring to FIG. 3, Resource 2 would permit any requesting entity with a role R2R1 to perform action A1 on Resource 2, would permit any requesting entity with a role R2R2 to perform action A2 on Resource 2, and would permit any requesting with a role R2R3 to perform action A3 on Resource 2. Given that the Access Policy 1 indicates that action A1 should be allowed for any requesting entity that is a member of Identity Group 1, the role R2R1 is identified for the requesting entity if the requesting entity is assigned to Identity Group 1.

Resource 3 would permit any requesting entity with a role R3R1 to perform action A1 on Resource 3, would permit any requesting entity with a role R3R2 to perform action A2 on Resource 3, and would permit any requesting with a role R3R3 to perform action A3 on Resource 3. Given that the Access Policy 1 indicates that action A1 should be allowed for any requesting entity that is a member of Identity Group 1, the role R3R1 is identified for the requesting entity if the requesting entity is assigned to Identity Group 1.

Furthermore, Resource 1 would permit any requesting entity with a role R1R1 to perform action A1 on Resource 1, would permit any requesting entity with a role R1R2 to perform action A2 on Resource 1, and would permit any requesting with a role R1R3 to perform action A3 on Resource 1. Given that the Access Policy 2 indicates that action A3 should be disallowed for any requesting entity that is a member of Identity 3, the role R1R3 is not identified for the requesting entity if the requesting entity is assigned to Identity 3. Accordingly, if some other process had assigned the role R1R3 to the Identity 3, that role is removed if the requesting entity is also assigned to Identity 3.

In one embodiment, since the action A1 is to be requested, then role information corresponding to all of roles R1R1, R2R1, and R3R1 may be included within the security token. However, a more efficient approach would be to consider the resources belonging to the relying party. For instance, if Resource 2 and Resource 3 were under the control of the relying party, the role information corresponding to roles R2R1 and R3R1 might be included, but R1R1 might not, considering that this role R1R1 is only relevant for accessing Resource 1 which is under the control of a different relying party.

The externalization system then constructs a security token (act 213) that includes the role information corresponding to the one or more roles. If the generation of the security token was performed by a different computing system, the role-based security token is then transmitted to the portion of the externalization system that provides the security token to the requesting entity.

Extending the patent application example, suppose that ABC Fiction Inc. claims that the requesting entity is a current employee of ABC Fiction Inc., or that its parent company claims that the requesting entity is a former employee of ABC Fiction Inc., the security token will be generated that identifies the requesting entity as having a role of R2R1 and R3R1. Alternatively, if the relying party only owned Resource 2, but not Resource 3, role information corresponding to role R2R1 would be included.

The security token is then provided to the requesting application (act 221), whereupon the security token is then provided to the relying party system (act 222). In the patent application example, the relying party system might be the patent office that is managing the three patent applications owned by ABC Fiction Inc. The relying party then interprets and applies the security token (act 223). If the role information were intermediate role information, part of this interpretation would be to identify the one or more roles corresponding to the role information.

In the patent application example, if the requesting party is an employee of ABC Fiction Inc. as claimed by ABC Fiction Inc., then the requesting party could provide a security token that has role information corresponding to roles R2R1 and R3R1. In that case, the patent office would permit the requesting entity to view the file wrapper of the patent applications represented by Resource 2 and Resource 3.

Accordingly, the principles described herein formulate a role-based token in a flexible manner in both the way that claims are used to assign a user to identifies, and in the manner in which access policies are assigned to one or more resources. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage devices having thereon computer-executable instructions that, when executed by one or more processors of the computing system, cause the computing system to perform the following:
   an act of accessing one or more claims having an expression regarding a requesting entity, the claim originating from a claim issuer;
   an act of evaluating the expression of at least one of each of the one or more claims;
   an act of assigning the requesting entity to one or more identities based on the evaluation of the expression of the claim as well as a determination of the claim issuer;
   determining the assigned one or more identities correspond to a single group identity that includes a plurality of different identities, the group identity representing the aggregate of the plurality of identities, such that membership in the group identity is based upon determining that the requesting entity has been assigned to at least one identity that is part of the plurality of identities;
   an act of identifying an access policy according to the group identity, the access policy specifying an action and a permission status corresponding to one or more resources belonging to a relying party;
   for each of at least one of the one or more corresponding resources, an act of identifying role information corresponding to one or more roles that, if held by the requesting entity, would cause a provider of the corresponding resource to enforce the permission status for the action should the requesting entity request to perform the action on the corresponding resource; and an act of constructing a security token that indicates the role information for each of the at least one of the corresponding one or more resources.

2. The computer program product in accordance with claim 1, further comprising:

an act of providing the security token to the requesting entity.

3. The computer program product in accordance with claim 1, wherein the permission status is to allow the action.

4. The computer program product in accordance with claim 1, wherein the permission status it to deny the action.

5. The computer program product in accordance with claim 1, wherein the one or more identities comprises a plurality of identities.

6. The computer program product in accordance with claim 5, wherein the one or more corresponding resources comprises a plurality of resources.

7. The computer program product in accordance with claim 1, wherein the one or more corresponding resources comprises a plurality of resources.

8. The computer program product in accordance with claim 1, wherein at least one of the one or more corresponding resources is a resource group representing a collection of a plurality of resources.

9. The computer program product in accordance with claim 1, wherein the one or more identities are a plurality of identities that are hierarchically structured in which at least one of the identities is an identity group comprising a subset of the plurality of identities.

10. The computer program product in accordance with claim 1, wherein the one or more resources are a plurality of resources that are hierarchically structured in which at least one of the resources is a resource group comprising a subset of the plurality of resources.

11. A computer program product comprising one or more computer-readable storage device having thereon computer-executable instructions that, when executed by one or more processors of the computing system, cause the computing system to perform the following method:

an act of accessing one or more claims having an expression regarding a requesting entity;

an act of evaluating the expression of at least one of each of the one or more claims;

an act of assigning the requesting entity to one or more identities using the evaluation of the expression of the claim;

determining the assigned one or more identities correspond to a single group identity that includes a plurality of different identities, the group identity representing the aggregate of the plurality of identities, such that membership in the group identity is based upon determining that the requesting entity has been assigned to at least one identity that is part of the plurality of identities;

an act of identifying an access policy according to the group identity, the access policy specifying an action and a permission status corresponding to a plurality of resources belonging to a relying party; and for each of at least one of the one or more corresponding resources, an act of identifying role information corresponding to one or more roles that, if held by the requesting entity, would cause a provider of the corresponding resource to enforce the permission status for the action should the requesting entity request to perform the action on the corresponding resource; and an act of constructing a security token that indicates only a portion of the role information for each of the at least one of the corresponding one or more resources, and such that the method includes removing some of the role information prior to constructing the security token based on a determination that the requesting entity is associated with an additional identity corresponding to a different access policy that includes a permission status that prohibits the requesting entity from accessing the one or more resources.

12. A computer program product in accordance with claim 11, wherein the method further includes:

an act of submitting the at least one of the one or more identities to a different computing system; and an act of receiving the role-based security token from the different computing system.

13. A computer program product in accordance with claim 11, wherein the computing system is a distributed computing system.

14. The computer program product in accordance with claim 11, wherein at least one of the one or more claims are generated within the computing system.

15. The computer program product in accordance with claim 13, wherein the distributed computing system includes an externalization system and a separate claim generation system and wherein at least one of the one or more claims are generated from the separate claim generation system.

16. The computer program product in accordance with claim 11, wherein the one or more identities are a plurality of identities that are hierarchically structured in which at least one of the identities is an identity group comprising a subset of the plurality of identities.

17. The computer program product in accordance with claim 11, wherein at least one of the one or more identities is an identity group comprising a collection of a plurality of identities.

18. A computing system comprising:

at least one processor; and one or more computer-readable storage devices having thereon computer-executable instructions that, when executed by the at least processor, cause the computing system to perform the following:

an act of accessing one or more claims having an expression regarding a requesting entity, the claim originating from a claim issuer;

an act of evaluating the expression of at least one of each of the one or more claims;

an act of assigning the requesting entity to one or more identities based on the evaluation of the expression of the claim as well as a determination of the claim issuer;

determining the assigned one or more identities correspond to a single group identity that includes a plurality of different identities, the group identity representing the aggregate of the plurality of identities, such that membership in the group identity is based upon determining that the requesting entity has been assigned to at least one identity that is part of the plurality of identities;

an act of identifying an access policy according to the group identity, the access policy specifying an action and a permission status corresponding to one or more resources belonging to a relying party;

for each of at least one of the one or more corresponding resources, an act of identifying role information corresponding to one or more roles that, if held by the requesting entity, would cause a provider of the corresponding resource to enforce the permission status for the action should the requesting entity request to perform the action on the corresponding resource; and an act of constructing a security token that indicates the role information for each of the at least one of the corresponding one or more resources, wherein the constructing of the security token includes excluding some of the role information that would otherwise authorize the requesting entity to access the one or more resources based on the access policy based on a determination that the requesting entity is also associated with an additional identity corresponding to a different access policy that includes a permission status that prohibits the requesting entity from accessing the one or more resources.

* * * * *